US011091191B2

(12) United States Patent
Miyake et al.

(10) Patent No.: US 11,091,191 B2
(45) Date of Patent: Aug. 17, 2021

(54) STEERING DEVICE

(71) Applicant: KYB Corporation, Tokyo (JP)

(72) Inventors: Soichiro Miyake, Aichi (JP); Yoshiyuki Tsukada, Gifu (JP)

(73) Assignee: KYB CORPORATION, Tokyo (JP)

( * ) Notice: Subject to any disclaimer, the term of this patent is extended or adjusted under 35 U.S.C. 154(b) by 279 days.

(21) Appl. No.: 16/219,948

(22) Filed: Dec. 14, 2018

(65) Prior Publication Data

US 2019/0202491 A1    Jul. 4, 2019

(30) Foreign Application Priority Data

Dec. 28, 2017  (JP) .............................. JP2017-253669

(51) Int. Cl.
  *B62D 3/12*      (2006.01)
  *B62D 5/04*      (2006.01)
  *F16H 55/26*     (2006.01)

(52) U.S. Cl.
  CPC .............. *B62D 3/126* (2013.01); *B62D 3/12* (2013.01); *B62D 5/0409* (2013.01); *B62D 5/0421* (2013.01); *F16H 55/26* (2013.01)

(58) Field of Classification Search
  CPC ........ B62D 3/126; B62D 3/12; B62D 5/0409; B62D 5/0421; F16H 55/26
  USPC .......................... 280/93.515, 93.514, 93.513
  See application file for complete search history.

(56) References Cited

U.S. PATENT DOCUMENTS

| 3,926,070 | A  | * | 12/1975 | Busso | B62D 7/22 74/498 |
|---|---|---|---|---|---|
| 4,827,788 | A  | * | 5/1989 | Beer | B62D 3/12 280/93.515 |
| 6,164,405 | A  | * | 12/2000 | Sakata | B60G 3/24 180/400 |
| 6,457,375 | B1 | * | 10/2002 | Buch | B62D 3/12 180/428 |
| 7,445,220 | B2 | * | 11/2008 | von Mayenburg | B60G 9/003 280/124.11 |
| 8,226,097 | B2 | * | 7/2012 | Kudla | B62D 21/11 280/93.515 |
| 9,586,612 | B2 | * | 3/2017 | Hardesty | B62D 3/12 |
| 2004/0238262 | A1 | * | 12/2004 | Saruwatari | B62D 5/0421 180/444 |

(Continued)

FOREIGN PATENT DOCUMENTS

JP     2013-141969 A     7/2013

*Primary Examiner* — Ruth Ilan
*Assistant Examiner* — Myles A Harris
(74) *Attorney, Agent, or Firm* — Hauptman Ham, LLP

(57) ABSTRACT

A steering device includes a rack housing portion housing a rack shaft, a pinion gear provided on one end side of the rack housing portion, a first supporting portion provided on the rack housing portion to support the one end side of the rack housing portion, and a second supporting portion provided on the rack housing portion to support the other end side of the rack housing portion. The second supporting portion includes a first vehicle body mounting portion and a second vehicle body mounting portion provided to project outwardly of the rack housing portion, the first and second vehicle body mounting portions being mounted on a vehicle body. The first and second vehicle body mounting portions are arranged to be shifted in an axial direction of the rack housing portion so as not to overlap in the axial direction.

7 Claims, 10 Drawing Sheets

(56) References Cited

U.S. PATENT DOCUMENTS

| | | | |
|---|---|---|---|
| 2013/0074621 A1* | 3/2013 | Ueno | B62D 3/12 74/30 |
| 2013/0160579 A1* | 6/2013 | Lee | B62D 3/12 74/29 |
| 2013/0180794 A1 | 7/2013 | Shiino et al. | |
| 2016/0339955 A1* | 11/2016 | Rodriguez | B62D 6/06 |
| 2017/0225708 A1* | 8/2017 | Lee | B62D 1/02 |

* cited by examiner

STEERING DEVICE

TECHNICAL FIELD

The present invention relates to a steering device.

BACKGROUND ART

JP2013-141969A describes a steering device provided in an engine compartment of a vehicle to apply a steering assist force to a turning wheel. In this steering device, mount bracket portions for mounting a rack tube on the side of a vehicle body are provided on both ends of the rack tube.

SUMMARY OF INVENTION

However, since a pair of the mount bracket portions are provided at positions symmetrical with respect to a center axis of the rack tube in the steering device described in JP2013-141969A, a part where the mount bracket portions are provided has a large width (external dimension in a direction perpendicular to the center axis of the rack tube). Thus, there is a problem of poor workability in mounting the steering device on the vehicle body. For example, if the rack tube has to be passed through an opening provided in a vehicle body frame, the mount bracket portions cannot be inserted into the opening depending on the size of the opening and it may not be possible to mount the steering device.

The present invention aims to provide a steering device excellent in mountability on a vehicle body.

According to one aspect of the present invention, a steering device, includes: a rack shaft configured to turn wheels; a rack housing portion housing the rack shaft; a pinion gear provided on one end side of the rack housing portion, the pinion gear being configured to transmit a rotational force to the rack shaft; a first supporting portion provided on the rack housing portion, the first supporting portion being configured to support the one end side of the rack housing portion; and a second supporting portion provided on the rack housing portion, the second supporting portion being configured to support the other end side of the rack housing portion, wherein the second supporting portion includes a first vehicle body mounting portion and a second vehicle body mounting portion provided to project outwardly of the rack housing portion, the first and second vehicle body mounting portion being mounted on a vehicle body; and the first and second vehicle body mounting portions are arranged to be shifted in an axial direction of the rack housing portion so as not to overlap in the axial direction.

DESCRIPTION OF EMBODIMENT

An embodiment of the present invention is described with reference to the drawings.

Figure 1:
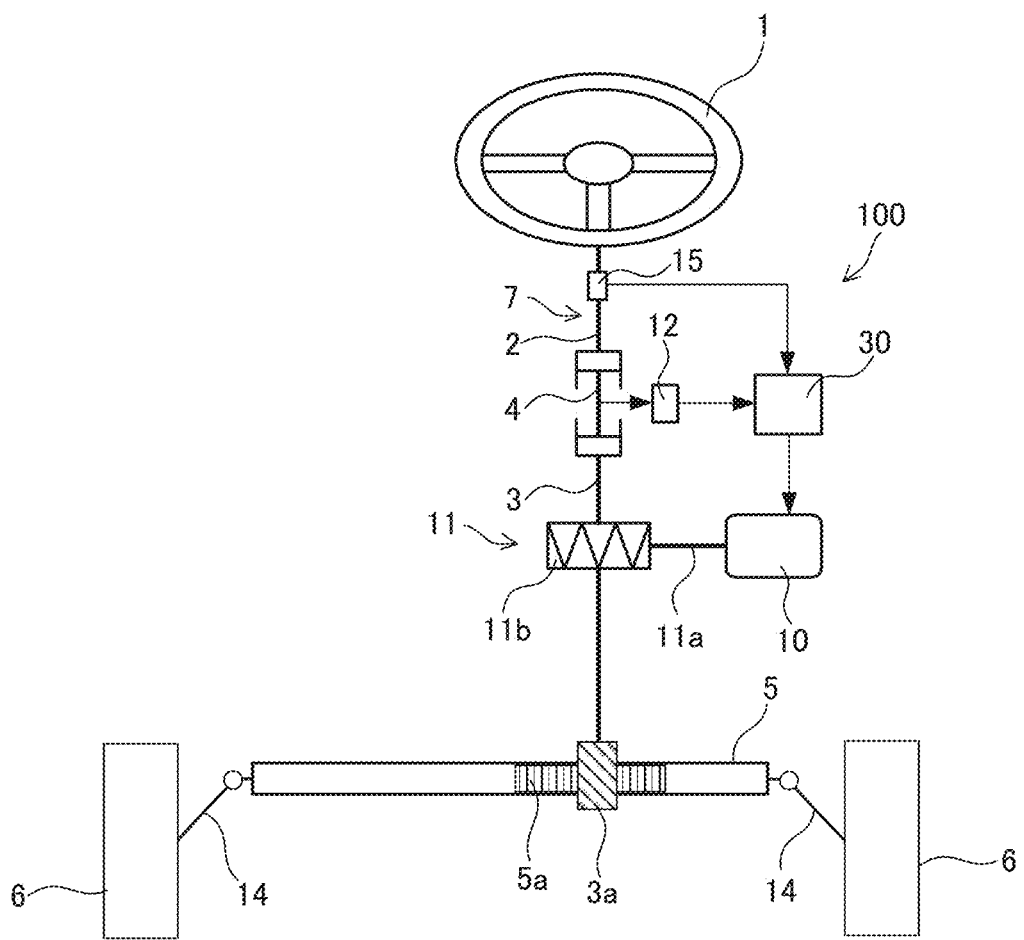
FIG. 1 is a configuration diagram of an electric power steering device according to an embodiment of the present invention.

FIG. 1 is a configuration diagram of an electric power steering device according to the embodiment of the present invention. As shown in FIG. 1, the electric power steering device (hereinafter, written as steering device) 100 includes an input shaft 2 configured to rotate as a driver operates a steering wheel 1, an output shaft 3 linked to a rack shaft 5 for turning wheels 6 and a torsion bar 4 coupling the input shaft 2 and the output shaft 3. A steering shaft 7 is constituted by the input shaft 2, the output shaft 3 and the torsion bar 4.

The output shaft 3 is formed with a pinion gear 3a meshed with a rack gear 5a formed on the rack shaft 5 to transmit a rotational force to the rack shaft 5. When the steering wheel 1 is operated, the steering shaft 7 rotates, the rotation thereof is translated into a linear motion of the rack shaft 5 by the pinion gear 3a and the rack gear 5a, and the wheels 6 are turned via tie rods 14.

The steering device 100 further includes an electric motor 10 serving as a power source for assisting the operation of the steering wheel 1 by the driver, a speed reducer 11 for decelerating and transmitting the rotation of the electric motor 10 to the steering shaft 7, a torque sensor 12 for detecting a torque acting on the torsion bar 4 by the relative rotation of the input shaft 2 and the output shaft 3 according to the steering operation by the driver, and a controller 30 for controlling the drive of the electric motor 10 on the basis of a detection result of the torque sensor 12.

The electric motor 10 is a brushed motor. The speed reducer 11 includes a worm shaft 11a coupled to an output shaft of the electric motor 10 and a worm wheel 11b coupled to the output shaft 3 and meshed with the worm shaft 11a. A torque output by the electric motor 10 is transmitted from the worm shaft 11a to the worm wheel 11b and applied as a steering assist torque to the output shaft 3.

A steering torque applied to the input shaft 2 according to the steering operation by the driver is detected by the torque sensor 12, and the torque sensor 12 outputs a voltage signal corresponding to that steering torque to the controller 30. The controller 30 calculates the torque output by the electric motor 10 on the basis of the voltage signal from the torque sensor 12 and controls the drive of the electric motor 10 so that the calculated torque is generated. In this way, the steering device 100 detects the steering torque applied to the input shaft 2 by the torque sensor 12 and assists the steering operation of the driver by controlling the drive of the electric motor 10 on the basis of the detection result by the controller 30.

The controller 30 controls the drive of the electric motor 10 in consideration of a steering angle detected by a steering angle sensor 15 in addition to the steering torque. When the electric motor 10 is driven, a rotational force of the electric motor 10 is transmitted to the rack shaft 5 via the speed reducer 11 and the pinion gear 3a.

Figure 2:
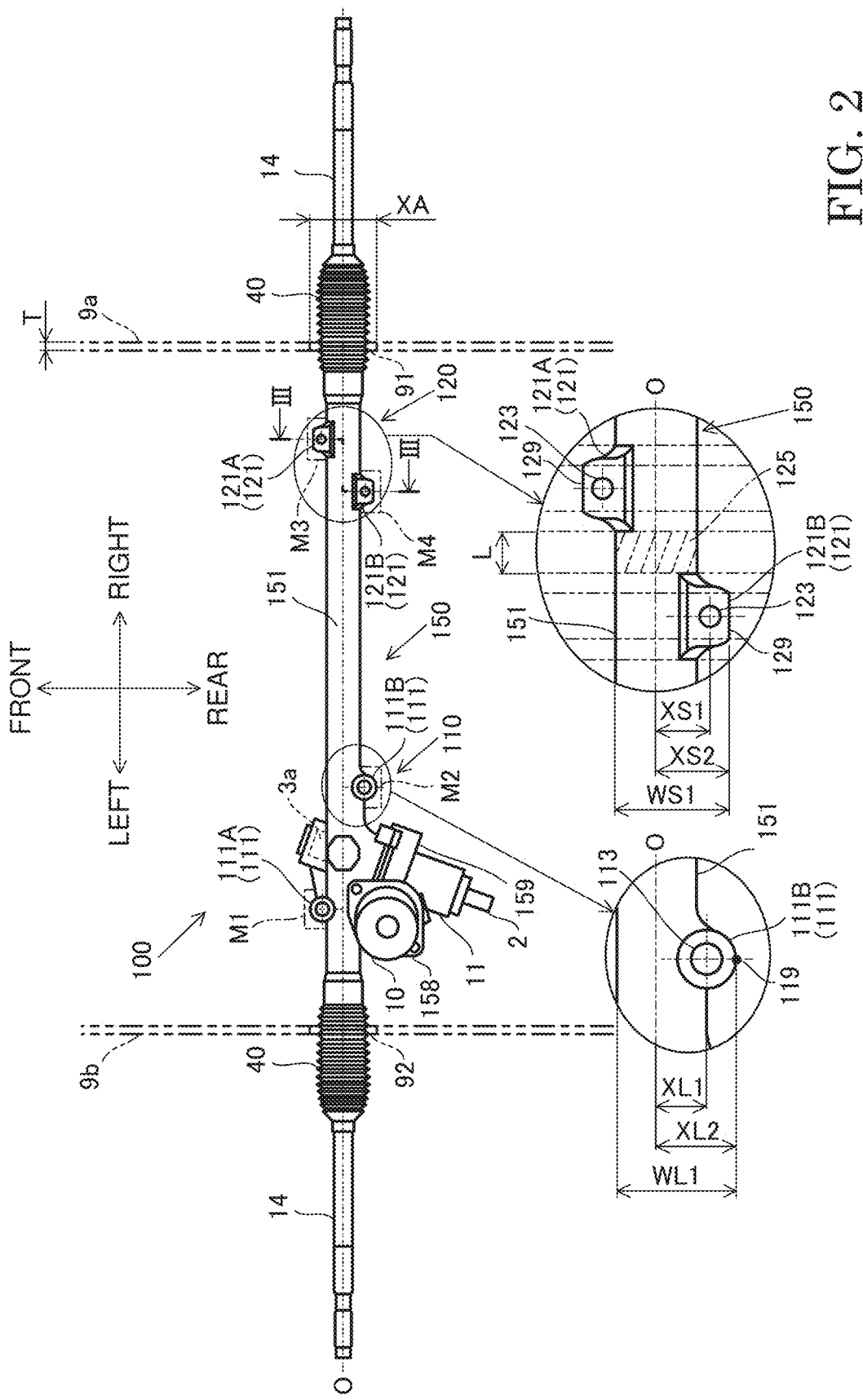
FIG. 2 is a plan view of the electric power steering device according to the embodiment of the present invention.

A housing 150 of the steering device 100 is described with reference to FIG. 2. It should be noted that front-rear and lateral directions of the steering device 10 are specified in accordance with front-rear and lateral directions of a vehicle body as shown for the convenience of description. The front-rear and lateral directions of the vehicle body are directions parallel to a horizontal direction perpendicular to a vertical direction. FIG. 2 is a plan view of the steering device 100 according to the embodiment of the present invention. In FIG. 2, side plates 9a, 9b constituting parts of a vehicle body frame and mounting seats M1, M2, M3 and M4 of the steering device 100 are shown by chain double-dashed line.

The housing 150 includes a rack housing 151 serving as a rack housing portion for housing the rack shaft 5 (see FIG. 1) extending straight along the lateral direction of the vehicle body, a motor housing 158 for housing the electric motor 10 (see FIG. 1) and a gear housing 159 for housing the speed reducer 11 and the pinion gear 3a (see FIG. 1). It should be noted that a direction parallel to a center axis O of the rack shaft 5 is called an axial direction. Since the rack shaft 5 and the rack housing 151 are concentric, the center axis O is also a center axis of the rack housing 151.

The rack housing 151 is formed into a hollow cylindrical shape open on both axial ends. The rack shaft 5 is passed through the rack housing 151 and both end parts thereof project from the both axial ends of the rack housing 151. The both end parts of the rack shaft 5 are connected to the tie rods 14. That is, the both end parts of the rack shaft 5 are respectively coupled to the wheels 6 on right and left sides via the tie rods 14. Connecting portions the rack shaft 5 with the tie rods 14 are covered by steering rack boots 40.

The gear housing 159 is mounted on one axial end side of the rack housing 151, and the motor housing 158 is mounted on the gear housing 159. It should be noted that the one axial end side of the rack housing 151 means a left side from a lateral center of the rack housing 151, and the other axial end side of the rack housing 151 means a right side from the lateral center of the rack housing 151.

A first supporting portion 110 for supporting the one axial end side of the rack housing 151 is provided on the one axial end side of the rack housing 151. A second supporting portion 120 for supporting the other axial end side of the rack housing 151 is provided on the other axial end side of the rack housing 151. The first and second supporting portions 110, 120 are mounted on the mounting seats M1, M2, M3 and M4 of the vehicle body frame by bolts and nuts. In this way, the steering device 100 is supported on both ends on the vehicle body.

The first supporting portion 110 includes a first large bolt mounting portion 111A serving as a vehicle body mounting portion to be mounted on the mounting seat M1 of the vehicle body frame and a second large bolt mounting portion 111B serving as a vehicle body mounting portion to be mounted on the mounting seat M2 of the vehicle body frame. The first and second large bolt mounting portions 111A, 111B are formed at both right and left sides of the gear housing 159 across the gear housing 159. The first large bolt mounting portion 111A is provided to project toward an outer front side of the rack housing 151, and the second large bolt mounting portion 111B is provided to project toward an outer rear side of the rack housing 151. Specifically, the first and second large bolt mounting portions 111A, 111B project in directions opposite to each other.

The first large bolt mounting portion 111A is arranged on a side closer to the left end of the rack housing 151 than the gear housing 159, i.e. on an axially outer side. The second large bolt mounting portion 111B is arranged on a side closer to the lateral center of the rack housing 151 than the gear housing 159, i.e. on an axially inner side. Since each of the first and second large bolt mounting portions 111A, 111B has a similar hollow cylindrical shape, the both are also collectively written as large bolt mounting portions 111 below.

The second supporting portion 120 includes a first small bolt mounting portion 121A serving as a first vehicle body mounting portion to be mounted on the mounting seat M3 of the vehicle body frame and a second small bolt mounting portion 121B serving as a second vehicle body mounting portion to be mounted on the mounting seat M4 of the vehicle body frame. The first and second small bolt mounting portions 121A, 121B respectively project in different directions. The first small bolt mounting portion 121A is provided to project toward the outer front side of the rack housing 151, and the second small bolt mounting portion 121B is provided to project toward the outer rear side of the rack housing 151. That is, the second supporting portion 120 is formed such that a projecting direction of the first small bolt mounting portion 121A and that of the second small bolt mounting portion 121B do not coincide. In the present embodiment, the first and second small bolt mounting portions 121A, 121B project in directions opposite to each other.

The first small bolt mounting portion 121A is arranged on a side closer to the right end of the rack housing 151 than the second small bolt mounting portion 121B, i.e. on an axially outer side. In other words, the second small bolt mounting portion 121B is arranged on a side closer to the lateral center of the rack housing 151 than the first small bolt mounting portion 121A, i.e. on an axially inner side. Since each of the first and second small bolt mounting portions 121A, 121B has a similar shape, the both are also collectively written as small bolt mounting portions 121 below.

Figure 3:
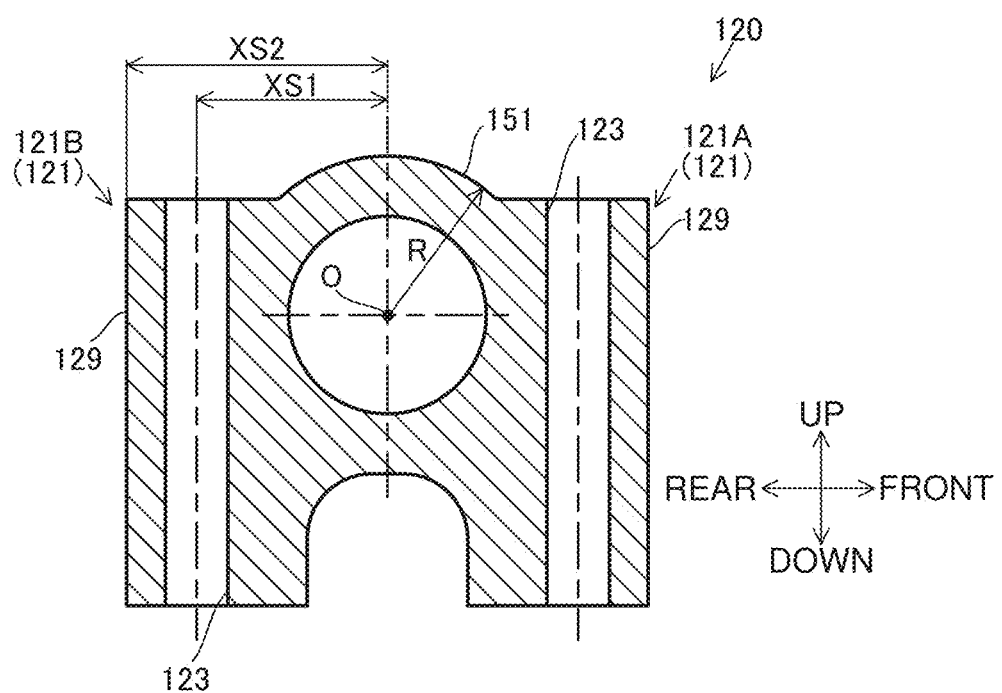
FIG. 3 is a cross-sectional view of a second supporting portion along line III-III of FIG. 2.

FIG. 3 is a cross-sectional view of the second supporting portion 120 along line III-III of FIG. 2. For the convenience of description, the vertical and front-rear directions of the steering device 100 are defined as shown.

As shown in FIGS. 2 and 3, the small bolt mounting portions 121 are provided with bolt mounting holes 123 into which bolts are to be mounted. The bolt mounting holes 123 vertically extend at positions separated by a predetermined distance XS1 from the center axis O of the rack shaft 5 in the front-rear direction.

An outermost side part 129 of the small bolt mounting portion 121 in a front-to-rear width direction, i.e. a part most distant from the center axis O of the rack shaft 5 in the front-rear direction, is a flat surface part parallel to the center axis O of the rack shaft 5. A pair of front and rear outermost side parts 129 of the small bolt mounting portions 121 are provided parallel to each other. A vertical dimension (height) of the small bolt mounting portion 121 is larger than an outer diameter of the rack housing 151. A lower end part of the small bolt mounting portion 121 has a substantially hollow cylindrical shape and projects further downward than the lower end surface of the rack housing 151.

A front-to-rear dimension XS2 from the center axis O of the rack shaft 5 to the outermost side part 129 is longer than the distance XS1 from the center axis O of the rack shaft 5 to a center axis of the bolt mounting hole 123 (XS2>XS1).

As shown in FIG. 2, the first and second small bolt mounting portions 121A, 121B are arranged to be shifted in the axial direction of the rack shaft 5. A shift amount in the axial direction is so set that the outermost side part 129 of the first small bolt mounting portion 121A in the front-to-rear width direction and the outermost side part 129 of the second small bolt mounting portion 121B in the front-to-rear width direction do not overlap in the axial direction of the rack housing 151.

In the present embodiment, the shift amount in the axial direction is so set that the entire first small bolt mounting portion 121A and the entire small bolt mounting portion 121B do not overlap in the axial direction of the rack housing 151. In other words, it means that the other small bolt mounting portion 121 is not present on a cut virtual plane when one small bolt mounting portion 121 is cut at an arbitrary position along the virtual plane perpendicular to the center axis O of the rack shaft 5.

In the present embodiment, a hollow cylindrical portion 125 where no small bolt mounting portion 121 is present is provided between the first and second small bolt mounting portions 121A, 121B. Specifically, the first and second small bolt mounting portions 121A, 121B are arranged to be separated in the axial direction. An axial length L of the hollow cylindrical portion 125 is longer than a thickness T of the side plates 9a, 9b to be described later.

The large bolt mounting portion 111 is provided with a bolt mounting hole 113 into which the bolt is to be mounted. The bolt mounting hole 113 vertically extends at a position separated by a predetermined distance XL1 in the front-rear direction from the center axis O of the rack shaft 5. The distance XL1 from the center axis O of the rack shaft 5 to a center axis of the bolt mounting hole 113 of the large bolt mounting portion 111 is equal to the distance XS1 from the center axis O of the rack shaft 5 to the center axis of the bolt mounting hole 123 of the small bolt mounting portions 121 (XL1=XS1).

A diameter of the bolt (small bolt) to be mounted into the small bolt mounting portion 121 is smaller than a diameter of the bolt (large bolt) to be mounted into the large bolt mounting portion 111. Thus, a diameter of the bolt mounting hole 123 provided in the small bolt mounting portion 121 is smaller than a diameter of the bolt mounting hole 113 provided in the large bolt mounting portion 111. For example, it is assumed that M10 (hereinafter, referred to as a standard size) denotes a standard bolt size (nominal diameter) adopted when the same bolt is mounted into each bolt mounting hole 113, 123. In this case, in the present embodiment, bolts of M12 larger than the standard size are employed for the large bolt mounting portions 111 and bolts of M8 smaller than the standard size are employed for the small bolt mounting portions 121. In this way, the size of the small bolt mounting portions 121 can be made smaller while necessary strength is ensured.

The outer surface of the large bolt mounting portion 111 is a curved surface arcuate in a plan view. An outermost side part 119 of the large bolt mounting portion 111 in the front-to-rear width direction, i.e. a part most distant from the center axis O of the rack shaft 5 in the front-rear direction, is a vertically extending straight part. A vertical dimension (height) of the large bolt mounting portion 111 is larger than the outer diameter of the rack housing 151. A lower end part of the large bolt mounting portion 111 has a hollow cylindrical shape and projects further downward than the lower end surface of the rack housing 151.

A front-to-rear dimension XL2 from the center axis O of the rack shaft 5 to the outermost side part 119 is longer than the aforementioned distance XL1 from the center axis O of the rack shaft 5 to the center axis of the bolt mounting hole 113 (XL2>XL1).

As described above, in the present embodiment, the bolt mounting holes 123 of the small bolt mounting portions 121 are formed smaller than the bolt mounting holes 113 of the large bolt mounting portions 111, and further, the outermost side parts 129 of the small bolt mounting portions 121 are formed to be parallel to the center axis O. Thus, the size of the small bolt mounting portions 121 can be made smaller than that of the large bolt mounting portions 111. In the present embodiment, the length XS2 from the center axis O of the rack shaft 5 to the outermost side parts 129 of the small bolt mounting portions 121 in the front-to-rear width direction is shorter than the length XL2 from the center axis O of the rack shaft 5 to the outermost side parts 119 of the large bolt mounting portions 111 in the front-to-rear width direction (XS2<XL2).

In the steering device 100, a front-to-rear width WS1 of a part where the small bolt mounting portion 121 is formed is the sum of the length XS2 and a radius R of the rack housing 151. In the steering device 100, a front-to-rear width WL1 of a part where the large bolt mounting portion 111 is formed is the sum of the length XL2 and the radius R of the rack housing 151. As described above, since the length XS2 is shorter than the length XL2, the front-to-rear width WS1 is shorter than the front-to-rear width WL1 (WS1<WL1). It should be noted that the front-to-rear width is an external dimension in a front-rear horizontal direction perpendicular to the center axis O of the rack shaft 5.

The vehicle body frame includes the pair of side plates 9a, 9b parallel to the front-rear direction and the vertical direction. Each of the side plates 9a, 9b is provided with a rectangular opening 91, 92. A front-to-rear dimension (opening width) XA of each of the openings 91, 92 is smaller than twice the length XS2 of the small bolt mounting portions 121 (XA<XS·2). The front-to-rear dimension (opening width) XA of each of the openings 91, 92 is larger than the front-to-rear width WS1 of the steering device 100 (XA>WS1). As shown in FIG. 2, the steering device 100 is fastened and fixed to the mounting seats M1, M2, M3 and M4 of the vehicle body frame by the bolts and nuts (not shown) while being inserted through the openings 91, 92 of the pair of side plates 9a, 9b.

Figure 4A:
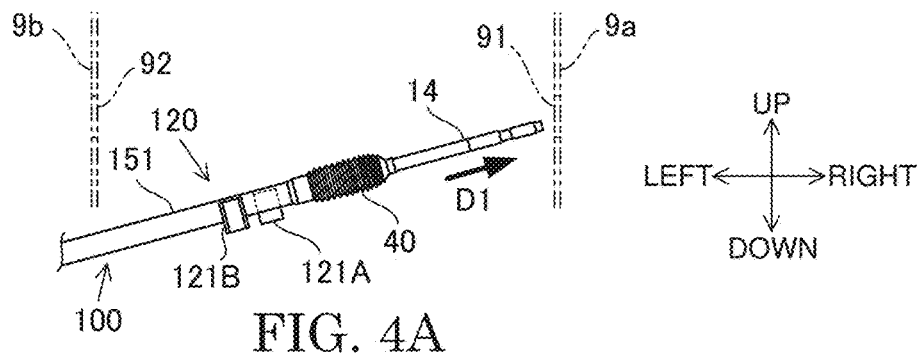
FIG. 4A is a view showing a procedure of positioning the electric power steering device.
Figure 4B:
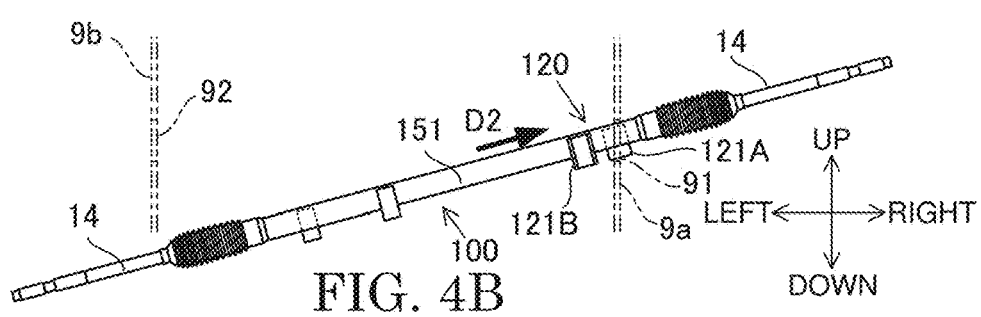
FIG. 4B is a view showing a procedure of inserting a right end side of the electric power steering device through an opening of a side plate.
Figure 4C:
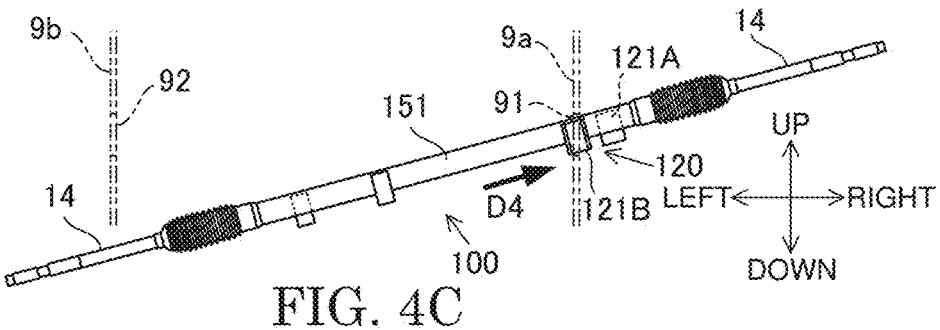
FIG. 4C is a view showing a procedure of inserting a second small bolt mounting portion through the opening of the side plate.
Figure 4D:
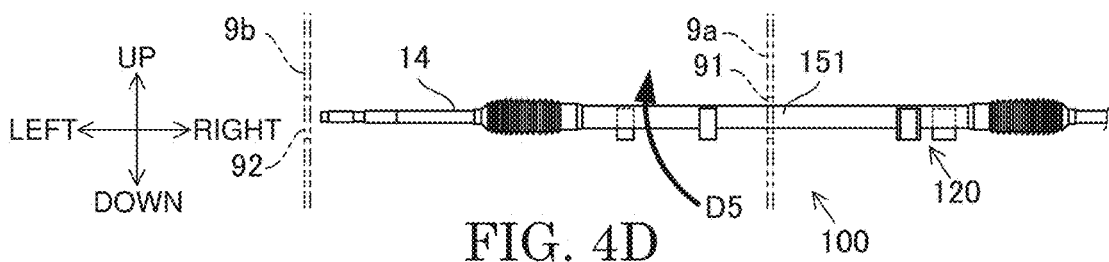
FIG. 4D is a view showing a procedure of rotating the electric power steering device.
Figure 4E:
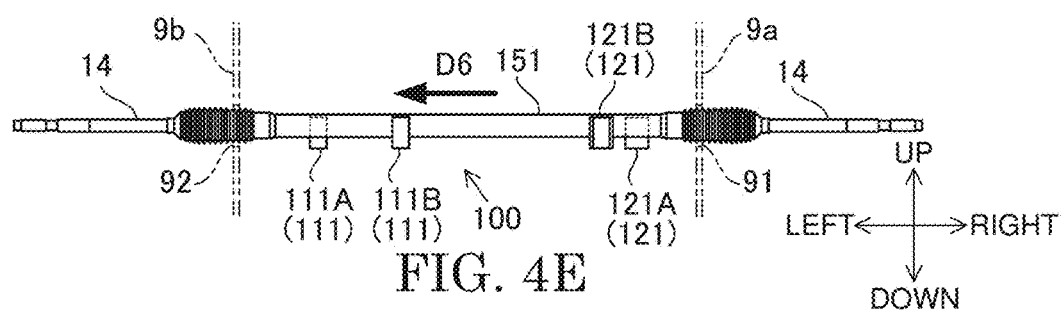
FIG. 4E is a view showing a procedure of inserting a left end side of the electric power steering device through an opening of a side plate.

An example of the procedure of mounting the steering device 100 on the vehicle body is described with reference to FIGS. 4A to 4E, FIGS. 5A to 5C, FIGS. 6A and 6B. FIGS. 4A to 4E are views showing the procedure of mounting the steering device 100 on the vehicle body when the steering device 100 is viewed from behind the vehicle body. It should be noted that the motor housing 158 and the gear housing 159 provided on a left end side of the steering device 100 are not shown. FIG. 4A is the view showing the procedure of positioning the steering device 100. FIG. 4B is the view showing the procedure of inserting a right end side of the steering device 100 through the opening 91 of the side plate 9a. FIG. 4C is the view showing the procedure of inserting the second small bolt mounting portion 121B through the opening 91 of the side plate 9a. FIG. 4D is the view showing the procedure of rotating the steering device 100. FIG. 4E is the view showing the procedure of inserting the left end side of the steering device 100 through the opening 92 of the side plate 9b.

Figure 5A:
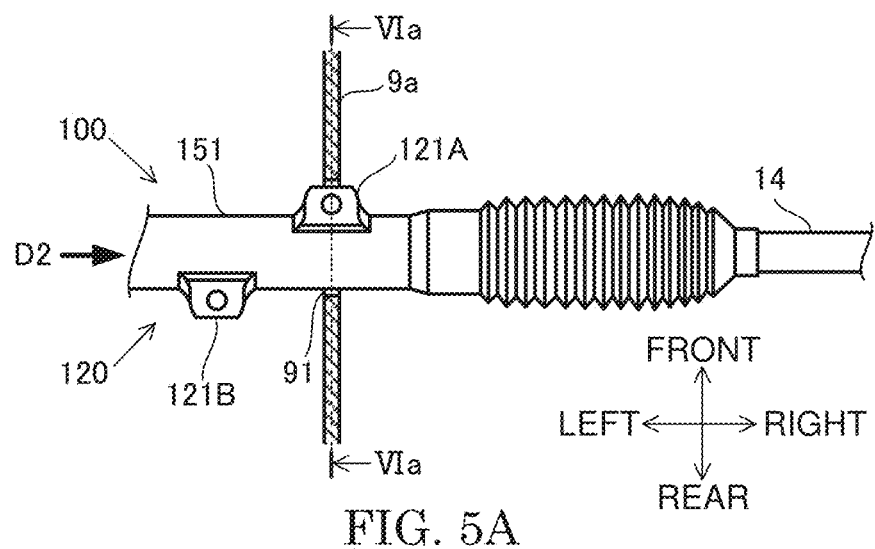
FIG. 5A is a partial enlarged view showing a state where a first small bolt mounting portion is located in the opening.
Figure 5B:
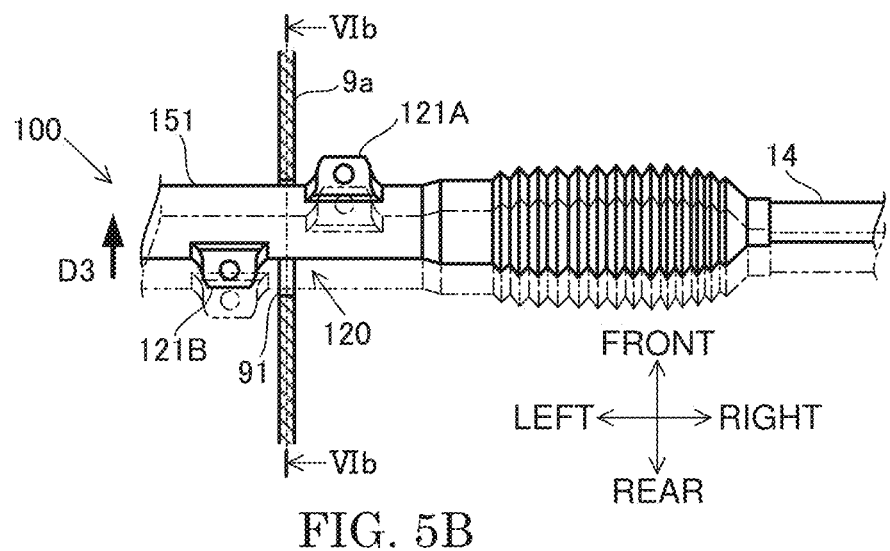
FIG. 5B is a partial enlarged view showing a state before the second small bolt mounting portion is inserted into the opening after the first small bolt mounting portion is inserted through the opening.
Figure 5C:
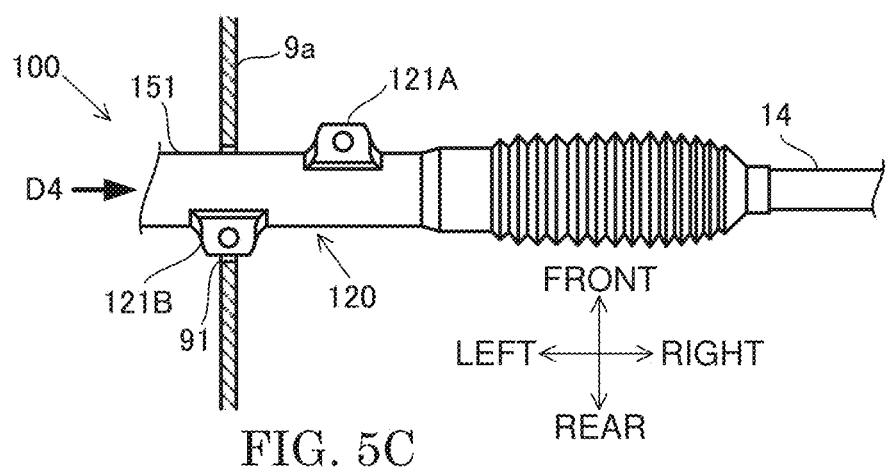
FIG. 5C is a partial enlarged view showing a state where the second small bolt mounting portion is located in the opening.

FIGS. 5A to 5C are partial enlarged views showing the procedure of inserting the steering device 100 through the opening 91 of the side plate 9a when the steering device 100 is viewed from above the vehicle body. FIG. 5A is the partial enlarged view showing a state where the first small bolt mounting portion 121A is located in the opening 91. FIG. 5B is the partial enlarged view showing a state before the second small bolt mounting portion 121B is inserted into the opening 91 after the first small bolt mounting portion 121A is inserted through the opening 91. FIG. 5C is the partial enlarged view showing a state where the second small bolt mounting portion 121B is located in the opening 91.

Figure 6A:
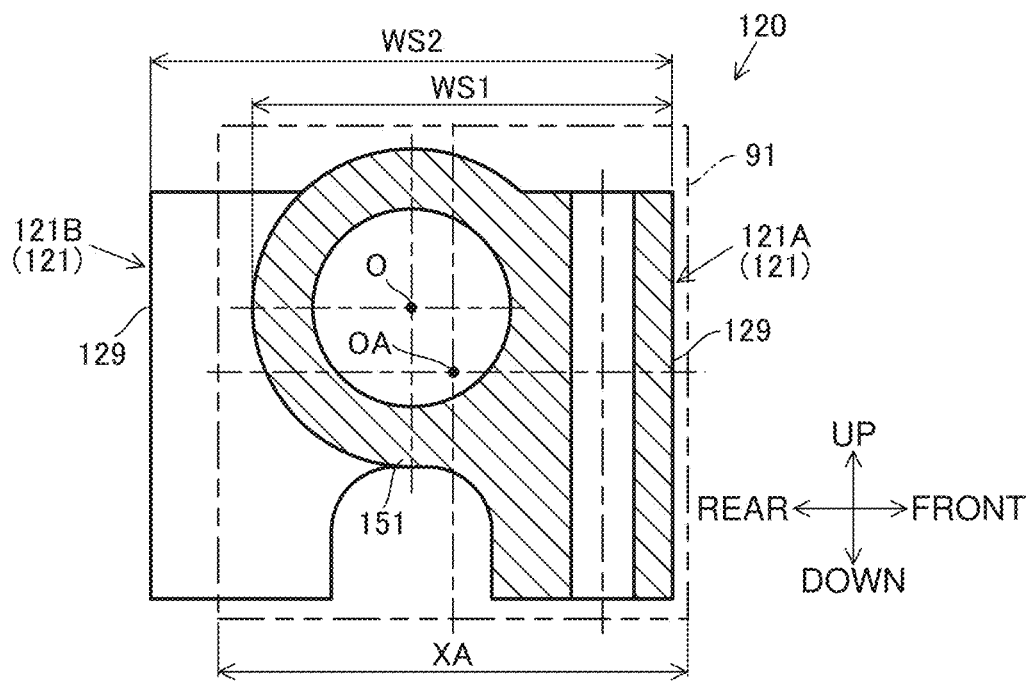
FIG. 6A is a cross-sectional view of the electric power steering device along line VIa-VIa of FIG. 5A.
Figure 6B:
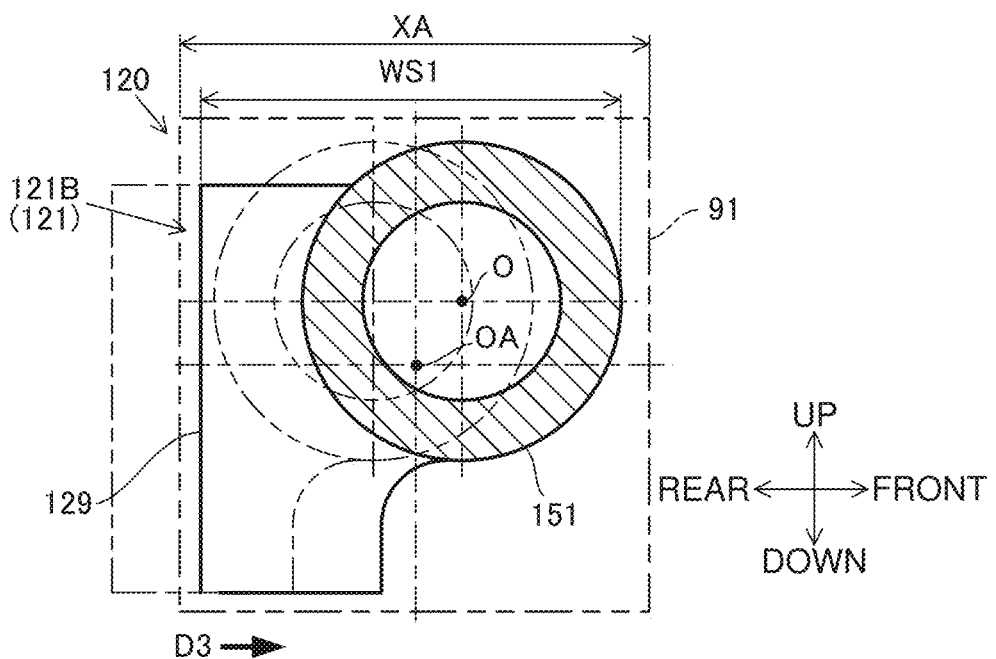
FIG. 6B is a cross-sectional view of the electric power steering device along line VIb-VIb of FIG. 5B.

FIG. 6A is a cross-sectional view of the steering device 100 along line VIa-VIa of FIG. 5A, and FIG. 6B is a cross-sectional view of the steering device 100 along line VIb-VIb of FIG. 5B. In FIGS. 6A and 6B, a positional relationship of the opening 91 of the side plate 9a and the steering device 100 passing through the opening 91 is shown. It should be noted that the front-rear, lateral and vertical directions of the vehicle body are specified as shown for the convenience of description.

As shown in FIG. 2, a dimension between the pair of side plates 9a, 9b is shorter than the entire length of the steering device 100. The openings 91, 92 of the pair of side plates 9a, 9b are not large enough to allow the insertion of the gear housing 159 and the motor housing 158. Thus, the left end of the steering device 100 needs to be inserted into the opening 92 of the side plate 9b after the steering device 100 is inclined in an arbitrary direction and the right end of the steering device 100 is inserted through the opening 91 of the side plate 9a.

As shown in FIG. 4A, the steering device 100 is positioned by being inclined in the vertical direction so that the right end of the steering device 100 is located higher than the left end with respect to the vehicle body. The steering device 100 is moved to a right-upper side (see an arrow D1) of the vehicle body, and the tie rod 14 constituting a right end part of the steering device 100 is inserted through the opening 91.

The steering device 100 is further moved to the right-upper side (see the arrow D1) of the vehicle body to insert the steering rack boot 40 into the opening 91.

As shown in FIGS. 4B and 5A, the steering device 100 is moved to the right-upper side (see an arrow D2) of the vehicle body to insert the first small bolt mounting portion 121A into the opening 91. As shown in FIG. 5A, the steering device 100 is so moved to the right-upper side (see the arrow D2) of the vehicle body that the first small bolt mounting portion 121A and the rack housing 151 do not interfere with the edge of the opening 91. It should be noted that, as shown in FIG. 6A, the center axis O of the rack housing 151 is arranged more rearwardly of the vehicle body than a center axis OA of the opening 91 before the first small bolt mounting portion 121A is inserted into the opening 91. By arranging the rack housing 151 closer to the rear edge of the opening 91 than to the front edge in advance, the first mount bracket portion mounting portion 121A and the rack housing 151 can be inserted without interfering with the edge of the opening 91.

As shown by chain double-dashed line in FIG. 5B, when the first small bolt mounting portion 121A completely exits from the opening 91 and is located at the right of the side plate 9a, the second small bolt mounting portion 121B is proximate to the edge of the opening 91. If the steering device 100 is directly moved in the axial direction (to the right-upper side of the vehicle body), the second small bolt mounting portion 121B interferes with the edge of the opening 91.

Thus, the steering device 100 is slightly moved to a front side of the vehicle body (see an arrow D3) from a position shown by chain double-dashed line in FIGS. 5B and 6B and the center axis O of the rack housing 151 is arranged forward of the center axis OA of the opening 91. By arranging the rack housing 151 closer to the front edge of the opening 91 than the rear edge, the opening 91 can be located in front of the second small bolt mounting portion 121B in the axial direction. It should be noted that the opening 91 may be located in front of the second small bolt mounting portion 121B in the axial direction by rotating the steering device 100 about the center axis O instead of moving the steering device 100 forward.

As shown in FIGS. 4C and 5C, the steering device 100 is moved to the right-upper side (see an arrow D4) of the vehicle body to insert the second small bolt mounting portion 121B into the opening 91. The steering device 100 is moved to the right-upper side (see the arrow D4) until the left end of the steering device 100 is located at the right of the side plate 9b.

The steering device 100 is so positioned that the opening 91 and the rack housing 151 are sufficiently spaced apart and the center axis O of the rack housing 151 is located on the center axis OA of the opening 91. As shown in FIG. 4D, the left end of the steering device 100 is lifted up with a vertical center of the opening 91 of the side plate 9a as a center of rotation to rotate the steering device 100 clockwise as shown (see an arrow D5). The steering device 100 is rotated until the center axis O of the rack shaft 5 becomes parallel to the lateral direction (i.e. horizontal direction).

As shown in FIG. 4E, the steering device 100 is moved leftward (see an arrow D6) to insert the tie rod 14 constituting a left end part of the steering device 100 into the opening 92. The bolt mounting holes 113 of the large bolt mounting portions 111 and the bolt mounting holes 123 of the small bolt mounting portions 121 are aligned with the mounting seats M1 to M4 (see FIG. 2) of the vehicle body frame. The respective bolt mounting portions 111A, 111B, 121A and 121B and the mounting seats M1, M2, M3 and M4 are fastened by the bolts and nuts.

In this way, the mounting of the steering device 100 on the vehicle body is completed. It should be noted that an example in which the steering device 100 is inclined in the vertical direction and moved to the right-upper side of the vehicle body such that the right end of the steering device 100 is located higher than the left end with respect to the vehicle body is shown in FIGS. 4A to 4C. However, a direction of inclination and an angle of inclination can be arbitrarily set according to a surrounding structure. For example, the steering device 100 may be inclined in the front-rear direction and moved to a right-front side or right-rear side of the vehicle body such that the right end of the steering device 100 is located in front of or behind the left end with respect to the vehicle body.

Figure 7:
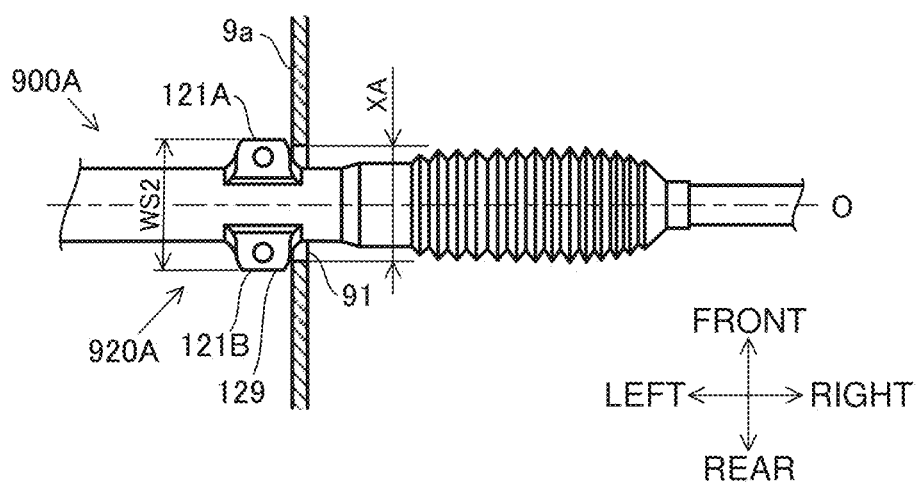
FIG. 7 is a view showing an electric power steering device according to Comparative Example 1 of the embodiment.

FIG. 7 is a view showing a steering device 900A according to Comparative Example 1 of the present embodiment. As shown in FIG. 7, the steering device 900A according to Comparative Example 1 is formed such that a first small bolt mounting portion 121A and a second small bolt mounting portion 121B are symmetrically shaped in the front-rear direction with respect to a center axis O. Thus, in Comparative Example 1, the first and second small bolt mounting portions 121A, 121B need to be simultaneously inserted into the opening 91. However, in Comparative Example 1, a front-to-rear width WS2 of a second supporting portion 920A is twice as long as a length XS2 from the center axis O to an outermost side part 129 and larger than the opening width XA of the opening 91. Thus, the second supporting portion 920A cannot be inserted into the opening 91. Therefore, the steering device 900A according to Comparative Example 1 has a problem that the steering device 900A cannot be mounted on the vehicle body.

In contrast, since the front-to-rear width WS1 of the second supporting portion 120 is smaller than the opening width XA of the opening 91 as shown in FIGS. 6A and 6B in the present embodiment, the second supporting portion 120 can be inserted through the opening 91.

Figure 8A:
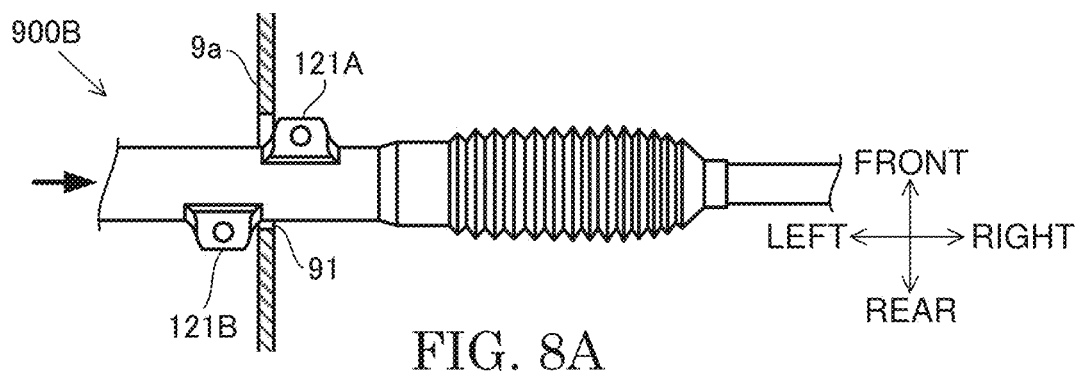
FIG. 8A is a partial enlarged view showing a state after a first small bolt mounting portion is inserted through the opening.
Figure 8B:
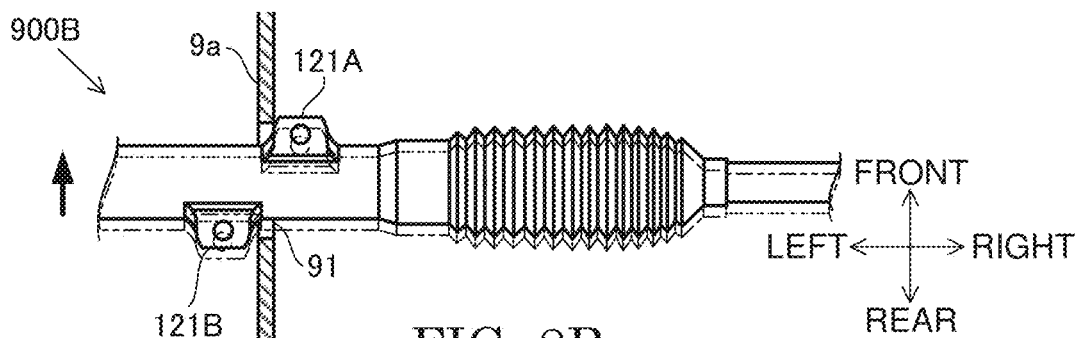
FIG. 8B is a partial enlarged view showing a first forward moving process of moving the electric power steering device to a front side of the vehicle body.
Figure 8C:
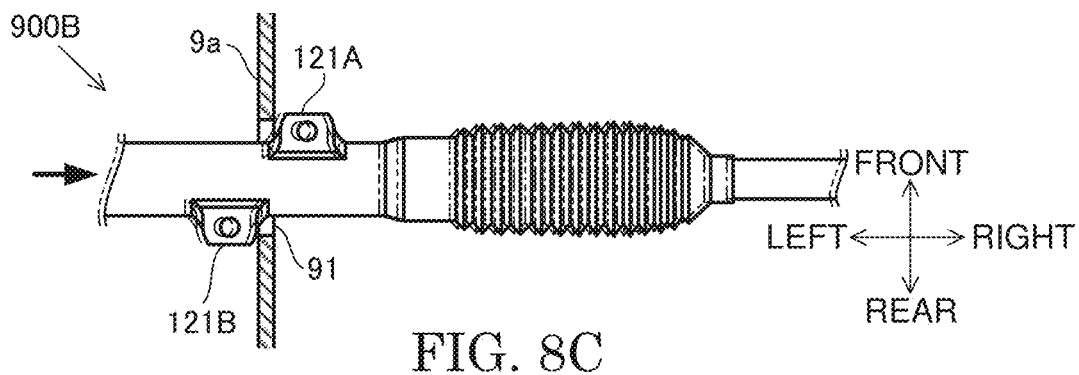
FIG. 8C is a partial enlarged view showing a rightward moving process of moving the electric power steering device to a right side of the vehicle body.
Figure 8D:
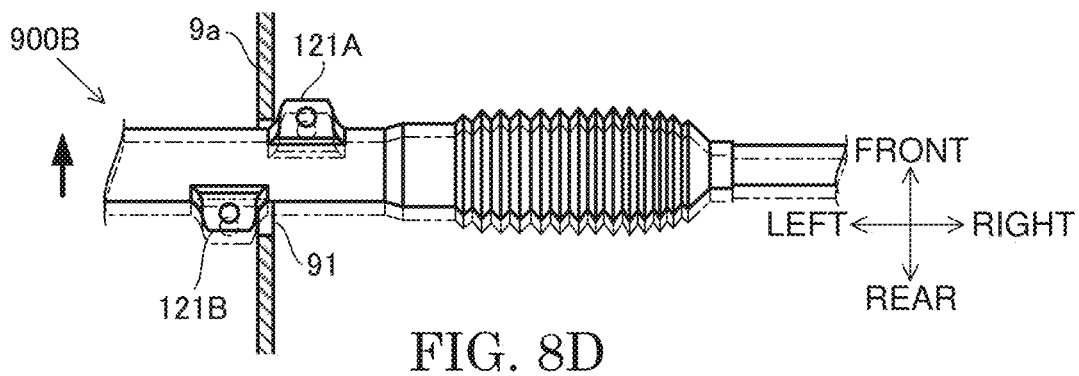
FIG. 8D is a partial enlarged view showing a second forward moving process of moving the electric power steering device to the front side of the vehicle body.

FIGS. 8A to 8D are partial enlarged views showing the procedure of inserting a steering device 900B according to Comparative Example 2 of the embodiment through the opening 91 of the side plate 9a when the steering device 900B is viewed from above the vehicle body. FIG. 8A is the partial enlarged view showing a state after a first small bolt mounting portion 121A is inserted through the opening 91. FIG. 8B is the partial enlarged view showing a first forward moving process of moving the steering device 900B to a front side of the vehicle body. FIG. 8C is the partial enlarged view showing a rightward moving process of moving the steering device 900B to a right side of the vehicle body. FIG. 8D is the partial enlarged view showing a second forward moving process of moving the steering device 900B to the front side of the vehicle body.

In Comparative Example 2, an axial dimension between the first and second small bolt mounting portions 121A, 121B is 0 and the hollow cylindrical portion 125 (see FIG. 2) of the above embodiment is not provided. In Comparative Example 2, after the first small bolt mounting portion 121A is inserted through the opening 91 as shown in FIG. 8A, the first forward moving process of slightly moving the steering device 900B toward the front side of the vehicle body is performed as shown in FIG. 8B. Thereafter, the rightward moving process of slightly moving the steering device 900B to the right side of the vehicle body is performed as shown in FIG. 8C and further the second forward moving process of slightly moving the steering device 900B to the front side of the vehicle body is performed as shown in FIG. 8D. As just described, unless a predetermined spacing is provided between the first and second small bolt mounting portions 121A, 121B, many processes are performed to insert the second small bolt mounting portion 121B through the opening 91 and insertion takes time and effort.

In contrast, in the present embodiment, the axial length L of the hollow cylindrical portion 125 between the first and second small bolt mounting portions 121A, 121B is longer than the thickness T of the side plate 9a. Thus, only one process of moving the steering device 100 to the front side of the vehicle body (see the arrow D3 in FIGS. 5B and 6B) needs to be performed and workability is good. It should be noted that since a thickness of a plate material constituting the vehicle body frame is about 0.5 mm to 5 mm, the axial length L of the hollow cylindrical portion 125 is preferably ensured to be 5 mm or longer, more preferably 10 mm or longer.

According to the above embodiment, the following functions and effects are achieved.

(1) The first and second small bolt mounting portions 121A, 121B are arranged to be shifted in the axial direction so as not to overlap in the axial direction of the rack housing 151. Thus, the maximum front-to-rear width WS1 of the second supporting portion 120 of the present embodiment can be made shorter than the maximum front-to-rear width WS2 of the second supporting portion 920A of Comparative Example 1 which the first and second small bolt mounting portions 121A, 121B are arranged without being shifted in the axial direction (WS1<WS2). In the present embodiment, the first and second small bolt mounting portions 121A, 121B can be respectively individually, i.e. successively inserted through the opening 91, and a front-to-rear width of a cross-section of the second supporting portion 120 in the opening 91 when the second supporting portion 120 is passing through the opening 91 can be made shorter. Thus, the insertability of the second supporting portion 120 through the opening 91 can be improved. Therefore, the steering device 100 excellent in mountability on the vehicle body can be provided according to the present embodiment.

(2) The first and second small bolt mounting portions 121A, 121B project in the directions opposite to each other. In the present embodiment, the first small bolt mounting portion 121A projects to a front side of the vehicle body, and the second small bolt mounting portion 121B projects to a rear side of the vehicle body. Since the hollow cylindrical rack housing 151 can be supported from both front and rear sides, the steering device 100 can be stably supported as compared to the case where the first and second small bolt mounting portions 121A, 121B project in the same direction.

(3) In the present embodiment, the length XS2 from the center axis O of the rack shaft 5 to the outermost side part 129 of the small bolt mounting portion 121 in the front-to-rear width direction is shorter than the length XL2 from the center axis O of the rack shaft 5 to the outermost side part 119 of the large bolt mounting portion 111 in the front-to-rear width direction. By suppressing a projecting length of the small bolt mounting portion 121 as compared to the large bolt mounting portion 111 and making the front-to-rear width WS1 of the second supporting portion 120 shorter than the front-to-rear width WL1 of the first supporting portion 110 in this way, the insertability of the second supporting portion 120 through the opening 91 can be further improved.

(4) The outermost side part 129 of the small bolt mounting portion 121 is formed to be parallel to the center axis O of the rack shaft 5. An outermost side part of the small bolt mounting portion 121 in the front-to-rear width direction is normally formed as an arcuate surface in conformity with the shape of the bolt mounting hole 123. However, in the present embodiment, the outermost side part is cut into a flat surface to make the front-to-rear width WS1 of the second supporting portion 120 shorter. Thus, the insertability of the second supporting portion 120 through the opening 91 can be further improved.

(5) The diameter of the bolt mounting holes 123 provided in the small bolt mounting portions 121 is smaller than the diameter of the bolt mounting holes 113 provided in the large bolt mounting portions 111. That is, the diameter of the bolts for mounting the second supporting portion 120 on the vehicle body is smaller than the diameter of the bolts for mounting the first supporting portion 110 on the vehicle body. In this way, the small bolt mounting portions 121 can be made smaller than the large bolt mounting portions 111. That is, the front-to-rear width WS1 of the second supporting portion 120 can be made smaller than the front-to-rear width WL1 of the first supporting portion 110. Since the front-to-rear width WS1 of the second supporting portion 120 can be made shorter by making the projecting length of the small bolt mounting portions 121 shorter, the insertability of the second supporting portion 120 through the opening 91 can be further improved.

(6) The axial length L of the hollow cylindrical portion 125 between the first and second small bolt mounting portions 121A, 121B is longer than the thickness T of the side plate 9a. Thus, only one process of moving the steering device 100 to the front side (see the arrow D3 in FIGS. 5B and 6B) of the vehicle body needs to be performed and workability is good.

(7) According to the present embodiment, the steering device 100 can be mounted on various vehicles by adjusting the shapes and axial shift amount of the first and second supporting portions 110, 120 of the steering device 100 in accordance with the size of the opening 91 for various vehicles in which the opening 91 of the side plate 9a of the vehicle body frame differs in size.

The following modifications are also within the scope of the present invention and it is also possible to combine a configuration shown in any of the modifications and the configuration described in the above embodiment and combine configurations described in the following different modifications.

Modifications 1

The shape of the small bolt mounting portions 121 is not limited to that of the above embodiment.

Modification 1-1

Figure 9A:
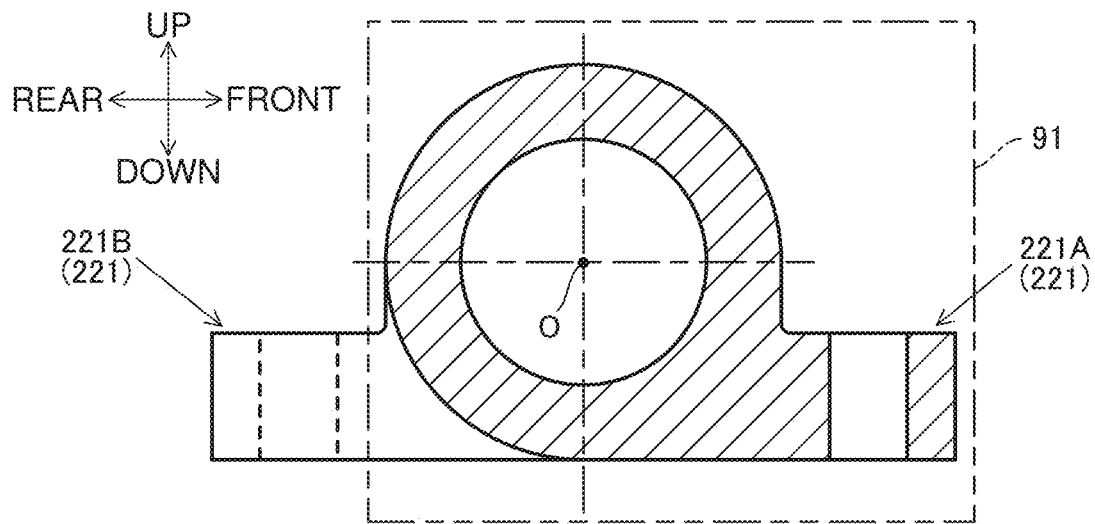
FIG. 9A is a cross-sectional view of an electric power steering device according to Modification 1-1 of the embodiment of the present invention.

For example, as shown in FIG. 9A, small bolt mounting portions 221 may project in the front-rear direction from a lower end part of the rack housing 151.

Modification 1-2

Figure 9B:
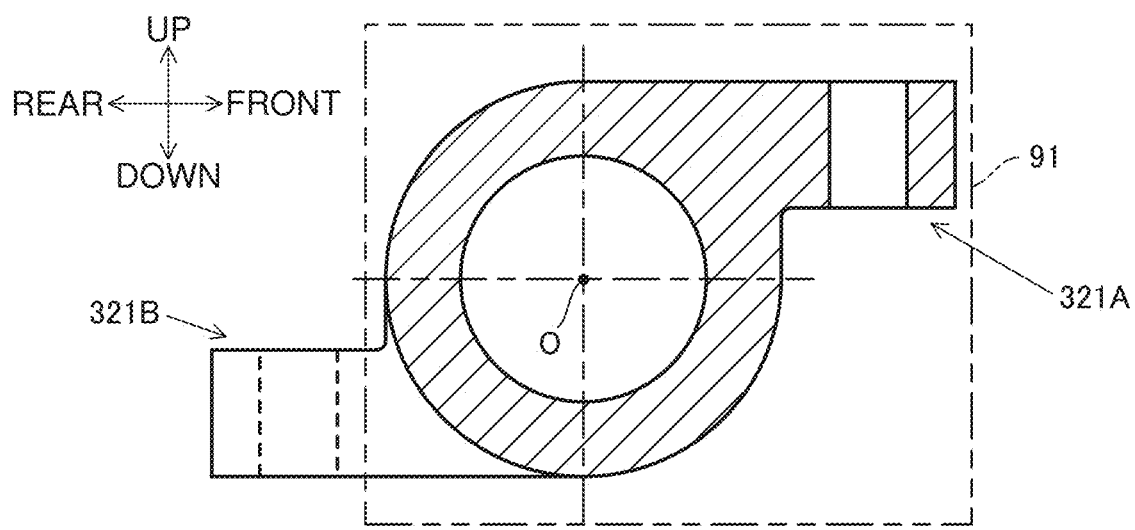
FIG. 9B is a cross-sectional view of an electric power steering device according to Modification 1-2 of the embodiment of the present invention.

As shown in FIG. 9B, first and second small bolt mounting portions 321A, 321B may be arranged so as to be shifted in the vertical direction.

As shown in FIGS. 9A and 9B, in Modifications 1, the first small bolt mounting portion 221A, 321A serving as the first vehicle body mounting portion and the second small bolt mounting portion 221B, 321B serving as the second vehicle body mounting portion project in directions opposite to each other as in the above embodiment. Thus, also in Modifications 1, the position adjustment of the steering device 100 can be completed if the steering device 100 is moved to the front side of the vehicle body when the second small bolt mounting portion 221B, 321B is inserted through the opening 91 as in the above embodiment, wherefore workability is better than in Modification 2 to be described below.

Modification 2

Figure 10:
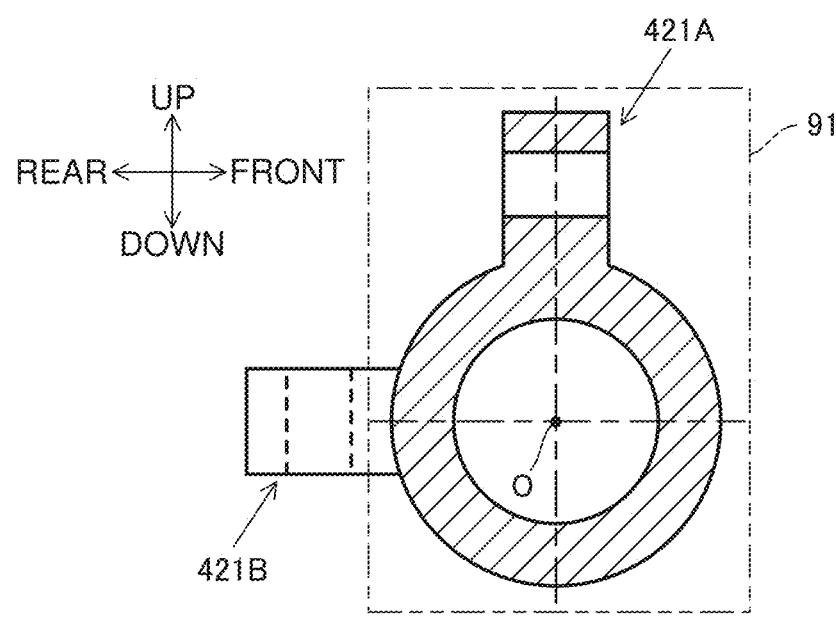
FIG. 10 is a cross-sectional view of an electric power steering device according to Modification 2 of the embodiment of the present invention.

Although an example in which the first and second small bolt mounting portions 121A, 121B project in the directions opposite to each other has been described in the above embodiment, the present invention is not limited to this. As shown in FIG. 10, a first small bolt mounting portion 421A serving as the first vehicle body mounting portion may be caused to project upwardly of the vehicle body and a second small bolt mounting portion 421B serving as the second vehicle body mounting portion may be caused to project rearwardly of the vehicle body. In this case, as shown in FIG. 10, the steering device 100 is rotated by 90° with the center axis O as a center of rotation so that the second small bolt mounting portion 421B faces upward after the first small bolt mounting portion 421A is inserted through the opening 91. Thereafter, the second small bolt mounting portion 421B is inserted into the opening 91.

Modification 3

Although not shown, the first and second small bolt mounting portions 121A, 121B may be respectively caused to project in the same direction. In this case, after the first small bolt mounting portion 121A is inserted through the opening 91, the second small bolt mounting portion 121B can be directly inserted through the opening 91 without any position adjustment.

Modification 4

Although an example in which the openings 91, 92 have a rectangular shape has been described in the above embodiment, the present invention is not limited to this. The openings 91, 92 may be formed to have various shapes such as a circular shape, an elliptical shape and a polygonal shape.

Modification 5

Although an example in which the first supporting portion 110 includes the first and second large bolt mounting portions 111A, 111B and the steering device 100 is supported on four points has been described in the above embodiment, the present invention is not limited to this. One of the first and second large bolt mounting portions 111A, 111B may be omitted and the steering device 100 may be supported on three points. Further, the first supporting portion 110 may include three or more bolt mounting portions.

Modification 6

Although an example in which the second supporting portion 120 includes the first and second small bolt mounting portions 121A, 121B has been described in the above embodiment, the present invention is not limited to this. The second supporting portion 120 may include three or more bolt mounting portions. In this case, the front-to-rear width of the second supporting portion 120 to be passed through the opening 91 is suppressed by shifting each bolt mounting portion in the axial direction from the others.

Modification 7

Although an example in which the outermost side parts 129 of the small bolt mounting portions 121 are flat surface parts has been described in the above embodiment, the present invention is not limited to this. The small bolt mounting portions 121 may be formed into a hollow cylindrical shape similarly to the large bolt mounting portions 111.

Modification 8

Although an example in which the bolt mounting holes 123 of the second supporting portion 120 are smaller in diameter than the bolt mounting holes 113 of the first supporting portion 110 has been described in the above embodiment, the present invention is not limited to this. The diameter of the bolt mounting holes 113 of the first supporting portion 110 and that of the bolt mounting hole 123 of the second supporting portion 120 may be equal.

Modification 9

Although an example in which the large bolt mounting portions 111 of the first supporting portion 110 and the small bolt mounting portions 121 of the second supporting portion 120 have different outer shapes has been described in the above embodiment, the present invention is not limited to this. The large bolt mounting portions 111 of the first supporting portion 110 and the small bolt mounting portions 121 of the second supporting portion 120 may have the same outer shape.

Modification 10

Although an example in which the first and second small bolt mounting portions 121A, 121B are similar in shape has been described in the above embodiment, the present invention is not limited to this. The first and second small bolt mounting portions 121A, 121B may have different shapes.

Modification 11

Although an example in which the steering device 100 is mounted on the vehicle body frame by the bolts and nuts has been described in the above embodiment, the present invention is not limited to this. The steering device 100 may be mounted on the vehicle body frame by other fastening members such as clamps instead of the bolts and nuts or the steering device 100 may be mounted on the vehicle body frame by welding instead of the fastening members. If the fastening members are used, the steering device 100 can be easily mounted and removed, wherefore maintainability is good.

Modification 12

Although an example in which the hollow cylindrical portion 125 is provided between the first and second small bolt mounting portions 121A, 121B has been described in the above embodiment, the present invention is not limited to this. As shown in Comparative Example 2 of the above embodiment, the axial dimension between the first and second small bolt mounting portions 121A, 121B may be 0.

At least the outermost side part 129 of the first small bolt mounting portion 121B in the front-to-rear width direction and the outermost side part 129 of the second small bolt mounting portion 121B in the front-to-rear width direction may be set not to overlap in the axial direction of the rack housing 151.

Modification 13

Although an example in which the electric motor 10 is a brushed motor has been described in the above embodiment, the present invention is not limited to this. The electric motor 10 may be configured as a brushless motor including a rotation angle sensor.

Modification 14

Although the electric power steering device has been described as an example in the above embodiment, the present invention can be applied also to a manual steering device including no electric motor 10.

The configuration, functions and effects of the embodiment of the present invention are summarized below.

The steering device 100 includes the rack shaft 5 configured to turn the wheels 6, the rack housing 151 serving as the rack housing portion for housing the rack shaft 5, the pinion gear 3a provided on the one end side of the rack housing 151 to transmit a rotational force to the rack shaft 5, the first supporting portion 110 provided on the rack housing 151 to support the one end side of the rack housing 151 and the second supporting portion 120 provided on the rack housing 151 to support the other end side of the rack housing 151. The second supporting portion 120 is provided to project outwardly of the rack housing 151 and includes the first small bolt mounting portion 121A, 221A, 321A, 421A serving as the first vehicle body mounting portion and the second small bolt mounting portion 121B, 221B, 321B, 421B serving as the second vehicle body mounting portion to be mounted on the vehicle body. The first small bolt mounting portion 121A, 221A, 321A, 421A and the second small bolt mounting portion 121B, 221B, 321B, 421B are arranged to be shifted in the axial direction of the rack housing 151 so as not to overlap in the axial direction.

In this configuration, the first small bolt mounting portion 121A, 221A, 321A, 421A and the second small bolt mounting portion 121B, 221B, 321B, 421B of the second supplying portion 120 can be successively inserted through the opening 91. Since the size of the cross-section of the second supporting portion 120 in the opening 91 when the second supporting portion 120 passes through the opening 91 can be made smaller, the insertability of the second supporting portion 120 through the opening 91 can be improved. Therefore, the steering device 100 excellent in mountability on the vehicle body can be provided according to the present embodiment.

In the steering device 100, the first small bolt mounting portion 121A, 221A, 321A, 421A and the second small bolt mounting portion 121B, 221B, 321B, 421B respectively project in different directions.

In the steering device 100, the first small bolt mounting portion 121A, 221A, 321A and the second small bolt mounting portion 121B, 221B, 321B respectively project in the directions opposite to each other.

In these configurations, the steering device 100 can be stably supported as compared to the case where the first small bolt mounting portion 121A, 221A, 321A, 421A and the second small bolt mounting portion 121B, 221B, 321B, 421B are respectively caused to project in the same direction.

In the steering device 100, each of the length from the center axis O of the rack shaft 5 to the outermost side part 129 of the first small bolt mounting portion 121A, 221A, 321A, 421A and the length from the center axis O of the rack shaft 5 to the outermost side part 129 of the second small bolt mounting portion 121B, 221B, 321B, 421B is shorter than the length from the center axis O of the rack shaft 5 to the outermost side part 119 of the large bolt mounting portion 111A, 111B serving as the vehicle body mounting portion of the first supporting portion 110.

In this configuration, the insertability of the second supporting portion 120 through the opening 91 can be further improved by making the size of each of the first small bolt mounting portion 121A, 221A, 321A, 421A and the second small bolt mounting portion 121B, 221B, 321B, 421B of the second supporting portion 120 smaller than that of the large bolt mounting portions 111A, 111B of the first supporting portion 110.

In the steering device 100, each of the outermost side part 129 of the first small bolt mounting portion 121A, 221A, 321A, 421A and the outermost side part 129 of the second small bolt mounting portion 121B, 221B, 321B, 421B is formed to be parallel to the center axis O of the rack shaft 5.

Since the size of the second supporting portion 120 can be made even smaller in this configuration, the insertability of the second supporting portion 120 through the opening 91 can be further improved.

In the steering device 100, each of the first and second supporting portions 110, 120 includes the bolt mounting holes 113, 123 into which the bolts are to be mounted, and the diameter of the bolt mounting holes 123 of the second supporting portion 120 is smaller than that of the bolt mounting holes 113 of the first supporting portion 110.

In this configuration, the size of the second supporting portion 120 can be made even smaller by as much as the diameter of the bolt mounting holes 123 is made smaller. In this way, the insertability of the second supporting portion 120 through the opening 91 can be further improved.

Embodiments of the present invention were described above, but the above embodiments are merely examples of applications of the present invention, and the technical scope of the present invention is not limited to the specific constitutions of the above embodiments.

This application claims priority based on Japanese Patent Application No. 2017-253669 filed with the Japan Patent Office on Dec. 28, 2017, the entire contents of which are incorporated into this specification by reference.

The invention claimed is:
1. A steering device, comprising:
a rack shaft configured to turn wheels;
a rack housing portion housing the rack shaft;
a pinion gear provided on one end side of the rack housing portion, the pinion gear being configured to transmit a rotational force to the rack shaft;
a first supporting portion provided on the rack housing portion, the first supporting portion being configured to support the one end side of the rack housing portion; and
a second supporting portion provided on the rack housing portion, the second supporting portion being configured to support the other end side of the rack housing portion, wherein
the second supporting portion includes a first vehicle body mounting portion and a second vehicle body mounting portion provided to project outwardly of the rack housing portion, the first and second vehicle body mounting portions being mounted on a vehicle body;
the first and second vehicle body mounting portions are arranged to be shifted in an axial direction of the rack housing portion so as not to overlap in the axial direction;
the first and second vehicle body mounting portions respectively project in different directions; and
when the steering device is mounted to the vehicle body, the rack housing portion is inserted into an opening of a vehicle body frame, the opening having an opening width,
each of a length from a center axis of the rack shaft to an outermost side part of the first vehicle body mounting portion and a length from the center axis of the rack shaft to an outermost side part of the second vehicle body mounting portion is longer than half of the opening width, and
each of a maximum width of the rack housing portion at a portion where the first vehicle body mounting portion is formed and a maximum width of the rack housing portion at a portion where the second vehicle body mounting portion is formed is shorter than the opening width.
2. The steering device according to claim 1, wherein the first and second vehicle body mounting portions respectively project in directions opposite to each other.
3. The steering device according to claim 1, wherein each of the length from the center axis of the rack shaft to the outermost side part of the first vehicle body mounting portion and the length from the center axis of the rack shaft to the outermost side part of the second vehicle body mounting portion is shorter than a length from the center axis of the rack shaft to an outermost side part of a vehicle body mounting portion provided on the first supporting portion.
4. The steering device according to claim 3, wherein each of the outermost side part of the first vehicle body mounting portion and the outermost side part of the second vehicle body mounting portion is formed to be parallel to the center axis of the rack shaft.
5. The steering device according to claim 1, wherein each of the first and second supporting portions includes a bolt mounting hole, a bolt being mounted into the bolt mounting hole, and
a diameter of the bolt mounting hole of the second supporting portion is smaller than a diameter of the bolt mounting hole of the first supporting portion.
6. A steering device, comprising:
a rack shaft configured to turn wheels;
a rack housing portion housing the rack shaft;
a pinion gear provided on one end side of the rack housing portion, the pinion gear being configured to transmit a rotational force to the rack shaft;
a first supporting portion provided on the rack housing portion, the first supporting portion being configured to support the one end side of the rack housing portion; and
a second supporting portion provided on the rack housing portion, the second supporting portion being configured to support the other end side of the rack housing portion, wherein
the second supporting portion includes a first vehicle body mounting portion and a second vehicle body mounting portion provided to project outwardly of the rack housing portion, the first and second vehicle body mounting portions being mounted on a vehicle body;

the first and second vehicle body mounting portions are arranged to be shifted in an axial direction of the rack housing portion so as not to overlap in the axial direction; and each of a length from a center axis of the rack shaft to an outermost side part of the first vehicle body mounting portion and a length from the center axis of the rack shaft to an outermost side part of the second vehicle body mounting portion is shorter than a length from the center axis of the rack shaft to an outermost side part of a vehicle body mounting portion provided on the first supporting portion.

7. A steering device, comprising:

a rack shaft configured to turn wheels;

a rack housing portion housing the rack shaft;

a pinion gear provided on one end side of the rack housing portion, the pinion gear being configured to transmit a rotational force to the rack shaft;

a first supporting portion provided on the rack housing portion, the first supporting portion being configured to support the one end side of the rack housing portion; and a second supporting portion provided on the rack housing portion, the second supporting portion being configured to support the other end side of the rack housing portion, wherein the second supporting portion includes a first vehicle body mounting portion and a second vehicle body mounting portion provided to project outwardly of the rack housing portion, the first and second vehicle body mounting portions being mounted on a vehicle body;

the first and second vehicle body mounting portions are arranged to be shifted in an axial direction of the rack housing portion so as not to overlap in the axial direction;

each of the first and second supporting portions includes a bolt mounting hole, a bolt being mounted into the bolt mounting hole; and a diameter of the bolt mounting hole of the second supporting portion is smaller than a diameter of the bolt mounting hole of the first supporting portion.

* * * * *